(12) United States Patent
Foster

(10) Patent No.: US 7,663,644 B2
(45) Date of Patent: Feb. 16, 2010

(54) AUTOMATIC ELEMENT SUBSTITUTION IN VECTOR-BASED ILLUSTRATIONS

(75) Inventor: Mason J. Foster, Walnut Creek, CA (US)

(73) Assignee: Autodesk, Inc., San Rafeal, CA (US)

( * ) Notice: Subject to any disclaimer, the term of this patent is extended or adjusted under 35 U.S.C. 154(b) by 463 days.

(21) Appl. No.: 11/268,797

(22) Filed: Nov. 8, 2005

(65) Prior Publication Data

US 2007/0103490 A1    May 10, 2007

(51) Int. Cl.
G09G 5/00 (2006.01)
(52) U.S. Cl. .................................. 345/619; 715/764
(58) Field of Classification Search ........................ None
See application file for complete search history.

(56) References Cited

U.S. PATENT DOCUMENTS

| | | | | |
|---|---|---|---|---|
| 4,817,187 A * | 3/1989 | Lien | | 382/253 |
| 4,941,193 A * | 7/1990 | Barnsley et al. | | 382/249 |
| 4,970,666 A | 11/1990 | Welsh et al. | | |
| 6,007,338 A * | 12/1999 | DiNunzio et al. | | 434/55 |
| 6,031,541 A * | 2/2000 | Lipscomb et al. | | 345/420 |
| 6,128,019 A * | 10/2000 | Crocker et al. | | 345/419 |
| 6,202,073 B1 * | 3/2001 | Takahashi | | 715/204 |
| 6,330,005 B1 * | 12/2001 | Tonelli et al. | | 715/735 |
| 6,373,499 B1 | 4/2002 | Acker | | |
| 6,426,748 B1 * | 7/2002 | Megahed | | 345/419 |
| 6,556,196 B1 * | 4/2003 | Blanz et al. | | 345/419 |
| 6,813,042 B2 | 11/2004 | Hawksworth et al. | | |
| 6,912,293 B1 * | 6/2005 | Korobkin | | 382/100 |
| 7,038,694 B1 * | 5/2006 | Santodomingo et al. | | 345/582 |
| 7,050,067 B2 | 5/2006 | Raubacher et al. | | |
| 7,277,572 B2 * | 10/2007 | MacInnes et al. | | 382/154 |
| RE40,384 E * | 6/2008 | Opincar et al. | | 345/641 |
| 7,479,959 B2 * | 1/2009 | Han et al. | | 345/420 |
| 2002/0059337 A1 * | 5/2002 | Takaoka et al. | | 707/500 |
| 2003/0011599 A1 * | 1/2003 | Du | | 345/428 |
| 2004/0075689 A1 * | 4/2004 | Schleiss et al. | | 345/771 |
| 2004/0263512 A1 * | 12/2004 | Santodomingo et al. | | 345/428 |
| 2005/0108215 A1 * | 5/2005 | Thomas et al. | | 707/3 |
| 2005/0122334 A1 * | 6/2005 | Boyd et al. | | 345/520 |
| 2005/0157931 A1 * | 7/2005 | Delashmit et al. | | 382/190 |
| 2005/0225552 A1 * | 10/2005 | Anand | | 345/473 |

(Continued)

OTHER PUBLICATIONS

Title: The Prologue Battle, Date: Jun. 10, 2004, URL: http://web.archive.org/web/*/http://lsdis.cs.uga.edu/~cthomas/courses/anim/slides/lotr_prologue_battle.html.*

(Continued)

*Primary Examiner*—Kee M Tung
*Assistant Examiner*—David H Chu
(74) *Attorney, Agent, or Firm*—Gates & Cooper LLP

(57) ABSTRACT

A method, apparatus, and article of manufacture are configured to substitute an element in a vector-based computer generated illustration. A computer generated illustration comprised of vector geometry is obtained. A block that consists of one or more referenced first ancillary elements is also obtained. An instance of the block is then placed into the illustration. The instance identifies one of the first ancillary elements in the block. Further, the identified first ancillary element is displayed in the illustration at a location where the instance was placed. The block may also be placed over an existing ancillary element which would cause the replacement of all similar ancillary elements with instances of the block.

22 Claims, 5 Drawing Sheets

U.S. PATENT DOCUMENTS

2006/0114262 A1\* 6/2006 Yamauchi et al. ........... 345/582
2008/0177994 A1\* 7/2008 Mayer ........................... 713/2

OTHER PUBLICATIONS

Author: Smartwebby.com, Title: "Flash Symbols", Date: Apr. 28, 2005, URL: http://web.archive.org/web/20050428080422/http://www.smartwebby.com/Flash/flash_symbols.asp (http://web.archive.org/web/\*/http://www.smartwebby.com/Flash/flash_symbols.asp).\*

\* cited by examiner

AUTOMATIC ELEMENT SUBSTITUTION IN VECTOR-BASED ILLUSTRATIONS

CROSS-REFERENCE TO RELATED APPLICATIONS

This application is related to the following co-pending and commonly-assigned patent application, which application is incorporated by reference herein:

U.S. patent application Ser. No. 11/268,796, entitled "DRAWING STYLE DOMAINS", by Mason J. Foster, Jose Madeira de Freitas Garcia, and Joseph Cleveland Ard, filed on the same date herewith.

BACKGROUND OF THE INVENTION

1. Field of the Invention

The present invention relates generally to architectural renderings, and in particular, to a method, apparatus, and article of manufacture for substituting ancillary elements in an architectural rendering.

2. Description of the Related Art

In the architectural, engineering, and construction (AEC) fields, computer aided design (CAD) drawings are often used to design blueprints, drawings, plans, etc. However, such CAD drawings may be complex, confusing, and fail to provide an end-user (e.g., a potential client) with a drawing or visualization of the "intent" of the architect or designer. Architectural renderings are designed to illustrate the "intent" of the designer or architect, as opposed to showing precise fidelity. Accordingly, architectural illustrators may create renderings of proposed sites and structures by interpreting architectural drawings—typically plans and elevations. To make these illustrations appear realistic, ancillary elements/objects, such as people, trees and vehicles are often added to the drawings. Some of these elements may appear in the building plans (e.g., landscaping elements), while others will not appear in the building plans.

In the prior art, once the objects (trees, people, cars) are in an illustration, changing one or more objects is time consuming. For example, if the designer wants to change one type of tree for another, existing trees must be deleted from the illustration, and replaced by others. Moreover, if changes are made to the base plan or elevations used in the illustration, the ancillary elements must be copied from an old drawing and pasted into the new one, or recreated. Accordingly, the prior art lacks the capability to efficiently substitute graphical elements in an architectural rendering.

SUMMARY OF THE INVENTION

Architectural illustrators create renderings of proposed sites and structures by interpreting architectural drawings—typically plans and elevations. To make these illustrations appear realistic, ancillary elements, such as people, trees and vehicles are often added to the drawings. Some of these elements may appear in the building plans—landscaping elements, for example. In the development of electronic illustrations, the designer may want to include/add objects like people and trees to drawing.

The problem is that once the objects (trees, people, cars) are in an illustration, changing or substituting the objects is time consuming. If the designer wants to change one type of tree for another, for example, existing trees must be deleted from the illustration, and replaced by others. Moreover, if changes are made to the base plan or elevations used in the illustration, the ancillary elements must be copied from an old drawing and pasted into the new one, or recreated.

The invention provides a mechanism by which automatic substitution can occur across named objects. For example, Birch trees can automatically be replaced by Oak trees and/or tall people can be replaced by short people. Elements may also have a size/scale that is used to automatically render the element at the size appropriate to the scale of the drawing/illustration. For example, elements may be sized automatically as they are rendered next to a drafted structure.

A mechanism also provides for randomizing the substitution of the element or its style. For example, each person may be chosen randomly from a variety of people. Alternatively, a parameter of the element may be randomized. For example, the height or clothing of a person may be randomized—with actual height ranges (or a percentage variation) supplied (e.g., by a user).

Throughout the substitution process, the underlying rendering of the building/structure may be unaffected. Accordingly, changes can be made to the underlying rendering independent of the ancillary objects. Once the changes are made, the ancillary objects may then be placed in the same position they were in the prior rendering.

Multi-blocks may also be used to add structured variation when placing or substituting blocks. A multi-block is essentially a block group; when the multi-block is placed, one of the blocks/elements in the group may be randomly selected and placed. In addition, users can create substitution rules so the block substitution occurs automatically. For example, if a drawing has a block called, "tree", and the user sets up a substitution rule saying, "Oak" is substituted for, "tree," when the drawing is imported or converted into a rendering/illustration, the program may make that substitution every time the conversion occurs. Substitution rules can also be used to vary the objects (e.g., one [1] tree from many, as in the case of multi-blocks), or to vary parameters of a particular object (e.g., a tree may have its height randomly varied by 20%).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a mechanism for automatically substituting ancillary named elements (or the style of one or more elements) in an architectural rendering. Further, the mechanism enables the ability to randomize the substitution of the element or its style.

Hardware and Software Environment

Figure 1:
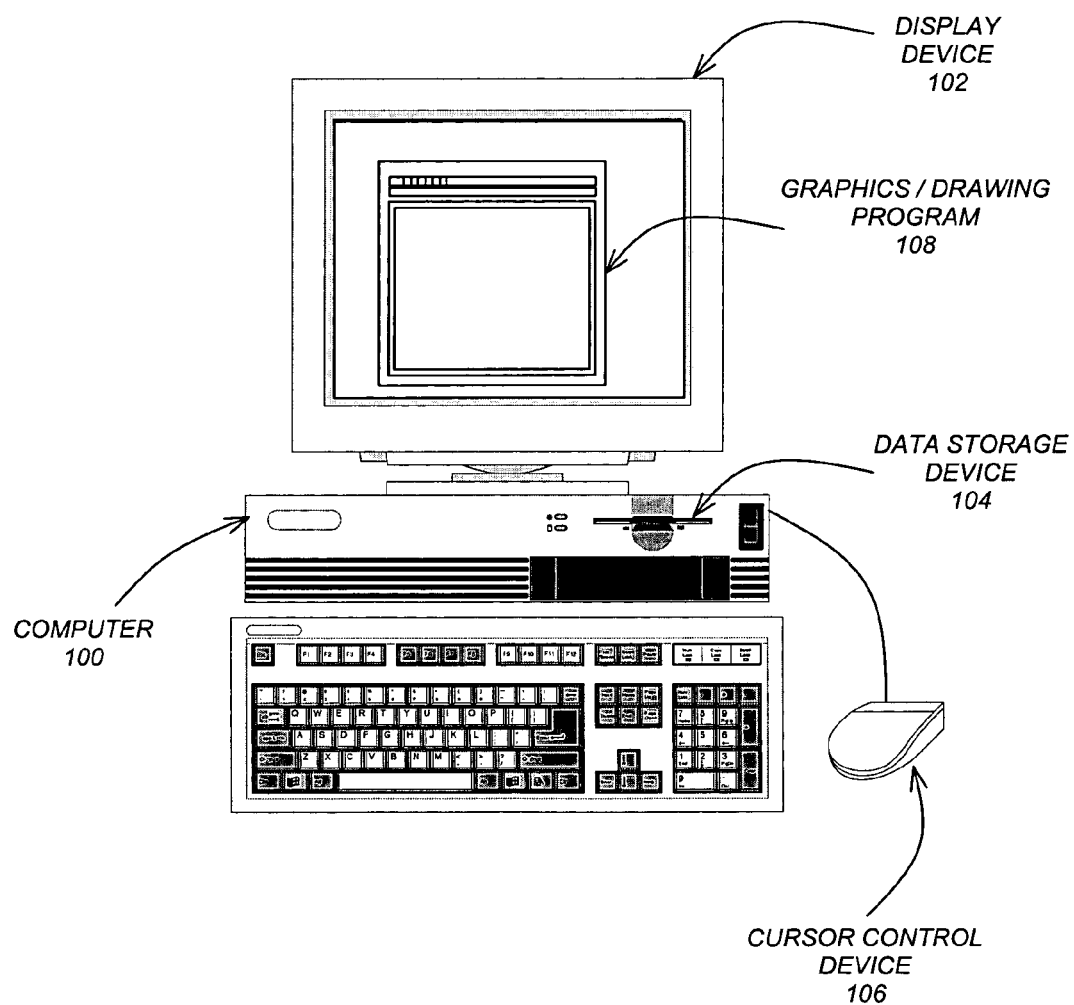
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Rendering Software

In one or more embodiments of the invention, graphics program 108 is an architectural rendering application that provides a rendering (e.g., hand-drawn, cartoon-like, ultra-realistic 3D content) of a drawing. Another graphics program 108 may consist of a more precise fidelity application such as a CAD application. When using an architectural rendering application 108, a drawing (and its content) may be imported from the precise fidelity application. The architectural rendering application 108 may be enabled to preserve information from the precise fidelity application such as layer information geometry and objects, views, etc.

As used herein, a drawing may have multiple layers wherein each layer refers to a collection of geometry. In addition, layers can be arranged into (nested) groups for organizational/selection purposes.

The user may desire to place images or ancillary elements or entities (images, ancillary elements, and entities may be referred to herein collectively as ancillary elements), such as people, trees, and vehicles in a drawing. In addition, such ancillary elements or the style of the ancillary elements may be easily substituted with other ancillary elements or style(s). A style (also referred to as an appearance style) is a definition that describes the display of (and inside of) a vector path (e.g., an ancillary element). Styles are commonly assigned to a particular layer (all objects on the same layer use the same style) but can be assigned to individual geometry as an override.

To facilitate such placement of an ancillary element, a block is used to represent one or more ancillary elements. The block may then be used by the user to place one or more of the ancillary elements in/on a drawing. By utilizing a block, the objects are displayed in the drawing but actually refer back to the block for the content. Accordingly, any change to the original entity/ancillary element in the block is propagated to all of the block instances (inserts).

Blocks may contain any type of entity/ancillary element including bitmap images, vector geometry, appearance styles (assigned to block components), other (nested) blocks, etc. Further, blocks do not require the enforcement of unique names. However, when duplicating or creating new blocks, a unique name may be beneficial.

The individual entities/ancillary elements within a block definition use a per-object appearance style assignment. When the user creates a block, the appearance style each entity is using is saved as a per-object assignment (even if the assignment was coming from a layer). However, block entities may also receive their style from the layer where the block is inserted/placed into the drawing. In this regard, the user would set the appropriate option (i.e., for a particular entity in the block) when creating the block, and when the block is used to place an entity/ancillary element, the style associated with the layer (in which the block is being placed) is applied to the entity/ancillary element. In view of the above, blocks have a unique relationship with layers. The contents (i.e., entities/ancillary elements) of a block do not belong to a layer. Instead, only the reference to the block (the insert or block instance) belongs to a layer.

Multi-Blocks

Multi-blocks are used to add structured variation when placing or substituting blocks. A multi-block is essentially a block group. When the multi-block is placed in a drawing, one of the entities/ancillary elements in the multi-block group may be randomly selected and placed in the drawing. Alternatively, a particular element in the multi-block may always be used or may be used with a particular frequency. Note that the drawing will contain a reference to a particular block/entity (i.e., the drawing has a block instance) and the content for the particular entity is obtained from the referenced block. In this regard, blocks, references, and instances may be implemented in an object-oriented environment with objects having methods and or variables. Further, as used herein, a block is synonymous with an entity or ancillary element.

A multi-block may be represented by one or more swatches or icons that provide a view/image of an entity/ancillary element(s) in the multi-block. Thus, a multi-block (i.e., a block containing multiple entities/ancillary elements) may contain multiple swatches. Multi-blocks may be created in various ways. For example, a block swatch may be dropped on top of another block swatch (resulting in a multi-block with the elements represented by the swatch); a block swatch may be dropped onto a multi-block (i.e., the block swatch is copied into the multi-block); multiple block swatches may be highlighted and an option selected to create a multi-block from the highlighted items (e.g., using a right-click menu or a button on a toolbar).

Figure 2:
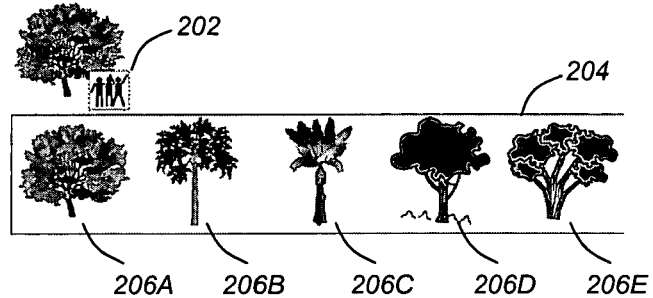
FIG. 2 illustrates a multi-block in accordance with one or more embodiments of the invention.

Multi-blocks cannot be nested. For example, if the user drags a two-item multi-block onto a three-item multi-block, a new five-item multi-block is created (the original multi-blocks may be preserved in the palette). FIG. 2 illustrates a multi-block in accordance with one or more embodiments of the invention. A block palette may be used to move, modify, and manipulate blocks. In the block palette, multi-blocks 202 are indicated by a special "group" icon 202. When the user clicks on the icon 202, a pop-up list 204 displays the one or more blocks 206A-206E within the definition of the multi-block. The user can place a specific block 206A-206E from the multi-block by dragging out from the pop-up menu 204. The user can also drag block swatches 206A-206E inside the multi-block pop-up menu 204 to rearrange or remove swatches 206A-206E. When the multi-block 202 is placed in a viewport/drawing, the first swatch 206A in the pop-up menu is used as the representative swatch for the multi-block 202. Accordingly, when placing an instance of the block, the representative swatch 206A may be displayed (e.g., as illustrated in the upper portion of FIG. 2) with the multi-block icon 202. Also, the user can remove a swatch 206A-206E from a multi-block 202 by dragging the swatch 206A-206E completely off the pop-up menu 204.

Block Palette

Figure 3:
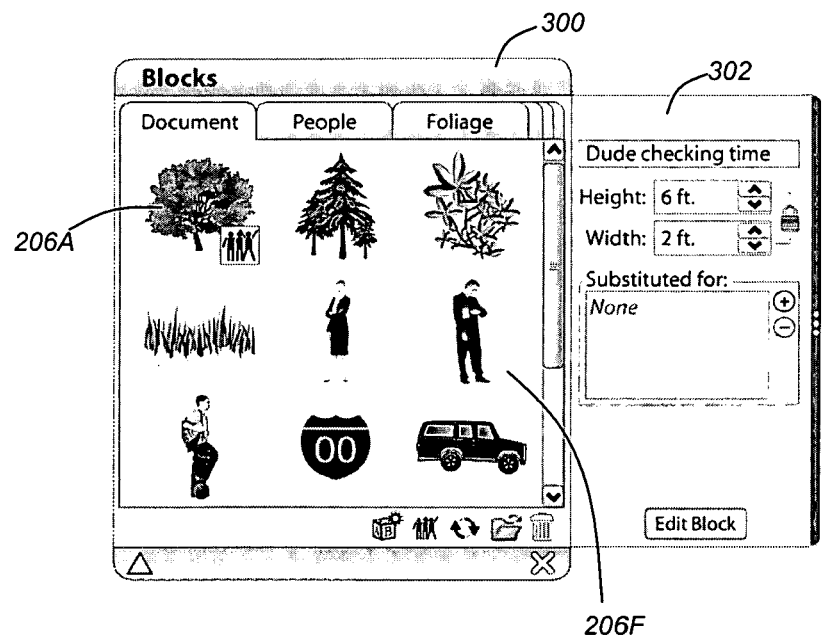
FIG. 3 illustrates an example of a block palette in accordance with one or more embodiments of the invention.

Once a block or multi-block 202 has been created, the user may view the block/multi-block in a block palette that contains swatches 206 of the various blocks. FIG. 3 illustrates an example of a block palette 300 in accordance with one or more embodiments of the invention. As illustrated in FIG. 3, various swatches 206 may be selected and properties for a selected swatch 206F may be displayed in a properties drawer 302. Further, if a user selects a block 206 in a viewport (i.e., the drawing/rendering containing a block), the respective block is automatically highlighted/selected in the block palette 300. Within the block palette 300, the user can drag and rearrange swatches 206 and may drag a block off of the palette 300 to insert an instance of a selected block into a drawing/viewport. Further, as described above, the user can create/edit multi-blocks using drag-and-drop methodology. For example, by dropping a block directly on top of another block in the palette 300, a multi-block may be created using copies (or by moving the block itself) of the two blocks.

As described above, blocks may be created from a current viewport selection. In this regard, multiple blocks in a viewport may be individually selected or selected all at once for grouping together into a multi-block. Alternatively, blocks highlighted (individually or all) in a palette 300 may be grouped together into a multi-block.

Block Substitution

Blocks, entities, and ancillary elements that exist in a drawing/viewport may be automatically substituted with another block, entity, ancillary element, or for all geometry on a layer. To facilitate the manner and type of substitution, a substitution dialog may be displayed by program 108. The substitution dialog may be opened when a user drags a block from a palette 300 onto a block in a viewport. Alternatively, the substitution dialog may be opened through a button or menu selection.

Figure 5:
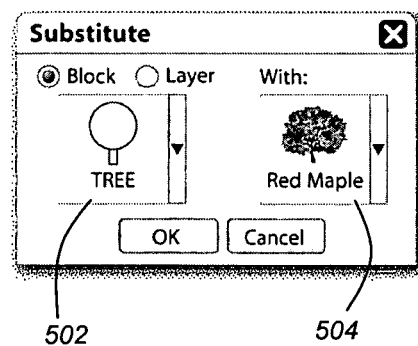
FIG. 5 illustrates a substitution dialog in accordance with one or more embodiments of the invention.
Figure 4:
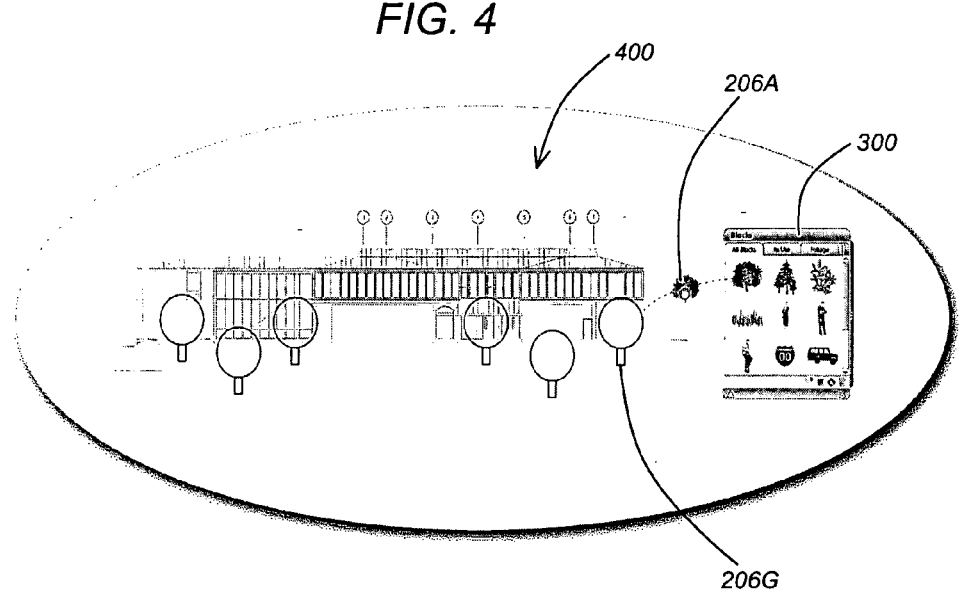
FIG. 4 illustrates a viewport containing multiple blocks and the dragging of a block from a palette over a block in the viewport in accordance with one or more embodiments of the invention.
Figure 6:
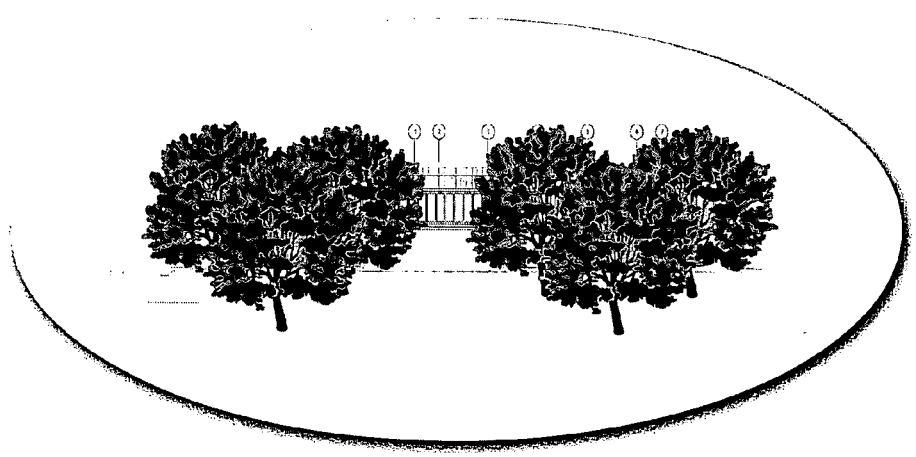
FIG. 6 illustrates a result after replacing instances of a block with a tree ancillary element in accordance with one or more embodiments of the invention.

FIG. 4 illustrates the viewport 400 containing multiple blocks and the dragging of a block 206A from the palette 300 over a block 206G in the viewport 400. Once the block 206A has been dropped onto block 206G, a substitution dialog may be displayed as illustrated in FIG. 5. The block 206G is displayed in one column 502 and the swatch/block 206A is displayed in a second column 504. Accordingly, the right column 504 lets the user choose a block to substitute. FIG. 5 illustrates a substitution dialog wherein block 206G will be replaced/substituted with block 206A (a red maple tree). Once acceptable, the user may click the "OK" button which replaces all instances of block 206G with red maple tree 206A as illustrated in FIG. 6.

When substituted, the new block's 206A base point is aligned with the base point of each of the original blocks 206G (or the center-points of each layer object). Substituted blocks 206A are inserted on the same layer as the original block 206G insert (or layer object).

The substitute dialog illustrated in FIG. 5 shows the "block" radio button selected wherein the block selected in column 502 is replaced with the block selected in the right column 504. If the "layer" radio button were selected, a layer drop-down list may appear (e.g., in the left column 502) and all objects on a selected layer may be replaced with the block selected in the right column 504.

In addition, the user may be presented with the option of varying the scale (e.g., by a percentage) and varying the rotation (e.g., by a percentage) upon the insertion of the new block 206A. The variation value may be an absolute value. For example, if a block is 10 units tall, and the variation is set to 10%, all instances of the block will be randomly sized (uniformly scaled) between 9 and 11 units tall. A "vary scale" option allows the user to set a variation value to vary the size of the block. Similarly, a "vary rotation" option allows the user to set a variation value to vary the rotation of the block wherein the block is rotated about the center of a block's bounding box.

Referring again to FIG. 3, the properties drawer 302 displays information about a highlighted block 206F. The height value indicates the height (in drawing units) of the selected block. When added to a figure, the block is automatically sized based on the figure's scale. Also note that if the height of the block is changed, all instances of the block in the drawing will be affected. The width value indicates the width (in drawing units) of the selected block. When added to a figure, the block is automatically sized based on the figure's scale. Further, similar to the height value, changing the width of a block will affect all instances of the block in the drawing. A user may also elect to lock the height/width ratio such that changing one will cause the other to change to preserve the scale.

The properties drawer also contains a "substituted for" section 304 that displays the substitution assignments for a selected block. The type of element being replaced (e.g., block or layer) may also be displayed (e.g., in parenthesis).

Figure 7:
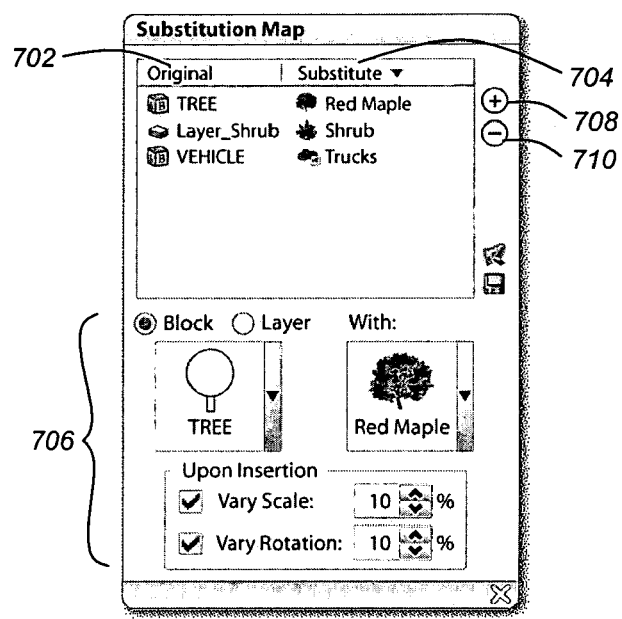
FIG. 7 illustrates a substitution map that displays all of the substitutions in a current drawing in accordance with one or more embodiments of the invention.

FIG. 7 illustrates a substitution map that displays all of the substitutions in a current drawing. The substitutions are displayed in the form of one or more rules that can be saved as a "map", that can be imported into another file or from another file as desired. It may be understood that the mapping may be easily transferred from one file to another. In this regard, the user can (even before opening a selected file) apply the same style and block substitution mapping from a different document. Such capabilities provide significant productivity gains. The map displays all of the assigned substitutions in two sortable, resizable columns 702 and 704 displaying the original block (or layer) name and the substituted block. A swatch may be displayed for the substituted block; however the items in the original column 702 may only display an icon to indicate whether it is a block or a layer.

When the user selects an item from the map, the substitute definition may be displayed below the list in area 706. The controls in area 706 are similar to those in the substitute dialog of FIG. 5 but are immediately applied (i.e., there is no "OK" button). Using the substitution map, the user can create a new substitution or remove a substitution via the add button "+" 708 or "−" button 710 respectively.

Block Editing

A palette may also be available to the user to allow the user to display and edit the contents of a block/swatch used in a drawing. In this regard, the user may have options similar to a paint application wherein different paths and colors may be modified/created/removed by the user.

Logical Flow

Figure 8:
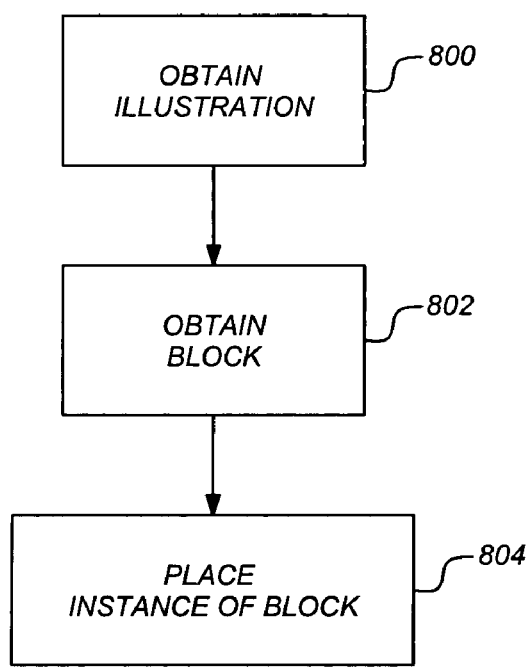
FIG. 8 illustrates the logical flow for placing/substituting an ancillary element in an vector-based computer generated illustration in accordance with one or more embodiments of the invention.

FIG. 8 illustrates the logical flow for placing/substituting an ancillary element in an vector-based computer generated illustration in accordance with one or more embodiments of the invention. At step 800, a computer generated illustrated comprised of vector geometry is obtained (e.g., created, retrieved, received, etc.). A block/multi-block consisting of one or more referenced ancillary elements is obtained at step 802. As described above, such a block may be created by the user using a block palette and/or drag and drop methodology.

At step 804, an instance of the block is placed in the illustration. Upon placing an instance of the block, the instance specifically identifies one of the ancillary elements of the block and displays the identified element at the location where the instance was placed. Thus, each block instance refers back to the block itself and contains a reference to a particular ancillary element of the block. In this regard, the content/drawing attributes for the ancillary element are obtained from the block and not from the instance that exists in the drawing. Thus, the instance of the bock in the drawing merely contains a reference to the block/multi-block and an identification of the particular ancillary element.

As described in detail above, the identified ancillary element of the block has a real world scale value (e.g., a height and width for a man or tree). The illustration may also have a scale value (e.g., a real world height and width). When the block instance is placed, the identified ancillary element may be automatically scaled based on the real world scale value (i.e., of the element itself) and scale value of the illustration. For example, if the ancillary element has an indicated height/scale of 5 foot 10 inches and the illustration has a height of 15 feet by 500 feet, the ancillary element that is displayed in the illustration will be appropriately scaled to appear consistent with the scale of the illustration. Such a scale may be specified on a per instance basis or on a per object basis across all instances.

The instance of the block may also be placed over an existing/displayed ancillary element or block. If the block is placed in such a manner, all instances of that ancillary element/block are replaced/substituted with the instance of the block.

The ancillary element from the block that is displayed (i.e., the identified ancillary element) may be automatically and randomly selected from multiple ancillary elements in the block (i.e., when the block is a multi-block). Accordingly, if multiple instances are being replaced/substituted, each instance may have a different ancillary element that is displayed.

Further, the ancillary element identified in the block instance may have a parameter that has been randomly varied. For example, the height of the ancillary element may be varied within a user-identified range (e.g., 20%). In such a situation, if multiple ancillary elements are being replaced with a particular oak tree in a block, the height of the oak tree may be automatically randomly varied within the 20% user specified range. Alternatively, a specific height may be specified for every instance. In view of the above, it may be understood that the user can define a substitution rule that automates the substitution of one or more ancillary elements in the illustration in a particular manner (e.g., random elements in a block, random value of a parameter for a particular element in a block, random values for various parameters for multiple different elements in a block, etc.).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for substituting an element in a vector-based computer generated illustration, comprising:
   (a) obtaining a computer generated illustration comprised of vector geometry;
   (b) obtaining a block comprised of a group of one or more original referenced first ancillary elements;
   (c) placing an instance of the block into the illustration by:
      (i) selecting one of the one or more original referenced first ancillary elements from the group;
      (ii) creating the instance of the block, wherein:
         (1) the instance comprises an identification of the selected one of the first ancillary elements; and
         (2) the instance comprises a reference to the block; and
      (iii) displaying, in the illustration, the selected first ancillary element at a location where the instance was placed by referring to the block for content of the illustration, wherein any change to one or more of the original referenced first ancillary elements in the block is propagated to all instances of the block.

2. The method of claim 1, wherein:
   the selected first ancillary element has a first real world scale value;
   the illustration has a second scale value; and
   the selected first ancillary element is automatically scaled based on the first real world scale value and the second scale value.

3. The method of claim 1, wherein:
   the illustration comprises one or more second ancillary elements;
   the instance of the block is placed over one of the second ancillary elements; and
   the placing of the instance of the block over one of the second ancillary elements replaces all of the one or more second ancillary elements in the illustration with block instances.

4. The method of claim 1, wherein:
   the group comprises two or more first ancillary elements;
   the first ancillary element selected in the instance of the block is automatically randomly selected from the group of two or more first ancillary elements in the block.

5. The method of claim 1, wherein the first ancillary element selected in the instance of the block comprises a parameter that has been randomly varied.

6. The method of claim 5, wherein the parameter comprises a height that is randomly varied within a percentage range.

7. The method of claim 1, wherein the instance of the block is placed in accordance with a user-defined substitution rule that automates a substitution of one or more second ancillary elements in the illustration.

8. The method of claim 1 further comprising:
substituting the instance of the block with an instance of a second block wherein such substituting automatically substitutes all of the instances of the block in the illustration with instances of the second block.

9. An apparatus for modifying a substituting an element in a vector-based computer generated illustration in a computer system comprising:
(a) a computer having a memory;
(b) an application executing on the computer, wherein the application is configured to
(i) obtain a computer generated illustration comprised of vector geometry;
(ii) obtain a block comprised of a group of one or more original referenced first ancillary elements;
(iii) place an instance of the block into the illustration by:
(1) selecting one of the one or more original referenced first ancillary elements from the group;
(2) creating the instance of the block, wherein:
(A) the instance comprises an identification of the selected one of the first ancillary elements; and
(B) the instance comprises a reference to the block; and
(3) displaying, in the illustration, the selected first ancillary element at a location where the instance was placed by referring to the block for content of the illustration, wherein any change to one or more of the original referenced first ancillary elements in the block is propagated to all instances of the block.

10. The apparatus of claim 9, wherein:
the selected first ancillary element has a first real world scale value;
the illustration has a second scale value; and
the selected first ancillary element is automatically scaled based on the first real world scale value and the second scale value.

11. The apparatus of claim 9, wherein:
the illustration comprises one or more second ancillary elements;
the instance of the block is placed over one of the second ancillary elements; and
the placing of the instance of the block over one of the second ancillary elements replaces all of the one or more second ancillary elements in the illustration with block instances.

12. The apparatus of claim 9, wherein the first ancillary element selected in the instance of the block is automatically randomly selected from a group of two or more first ancillary elements in the block.

13. The apparatus of claim 9, wherein the first ancillary element selected in the instance of the block comprises a parameter that has been randomly varied.

14. The apparatus of claim 13, wherein the parameter comprises a height that is randomly varied within a percentage range.

15. The apparatus of claim 9, wherein the instance of the block is placed in accordance with a user-defined substitution rule that automates a substitution of one or more second ancillary elements in the illustration.

16. A computer-readable device embodying logic that causes a computer-implemented system to substitute an element in a vector-based computer generated illustration, wherein the logic comprises:
(a) obtaining a computer generated illustration comprised of vector geometry;
(b) obtaining a block comprised of a group of one or more original referenced first ancillary elements;
(c) placing an instance of the block into the illustration by:
(i) selecting one of the one or more original referenced first ancillary elements from the group;
(ii) creating the instance of the block wherein:
(1) the instance comprises an identification of the selected one of the first ancillary elements; and
(2) the instance comprises a reference to the block; and
(iii) displaying, in the illustration, the selected first ancillary element at a location where the instance was placed by referring to the block for content of the illustration, wherein any change to one or more of the original referenced first ancillary elements in the block is propagated to all instances of the block.

17. The device of claim 16, wherein:
the selected first ancillary element has a first real world scale value;
the illustration has a second scale value; and
the selected first ancillary element is automatically scaled based on the first real world scale value and the second scale value.

18. The device of claim 16, wherein:
the illustration comprises one or more second ancillary elements;
the instance of the block is placed over one of the second ancillary elements; and
the placing of the instance of the block over one of the second ancillary elements replaces all of the one or more second ancillary elements in the illustration with block instances.

19. The device of claim 16, wherein the first ancillary element selected in the instance of the block is automatically randomly selected from the group of two or more first ancillary elements in the block.

20. The device of claim 16, wherein the first ancillary element selected in the instance of the block comprises a parameter that has been randomly varied.

21. The device of claim 20, wherein the parameter comprises a height that is randomly varied within a percentage range.

22. The device of claim 16, wherein the instance of the block is placed in accordance with a user-defined substitution rule that automates a substitution of one or more second ancillary elements in the illustration.

* * * * *